(No Model.)
B. F. BARNES.
COMBINED PLANTER AND FERTILIZER DISTRIBUTER.
No. 254,188. Patented Feb. 28, 1882.
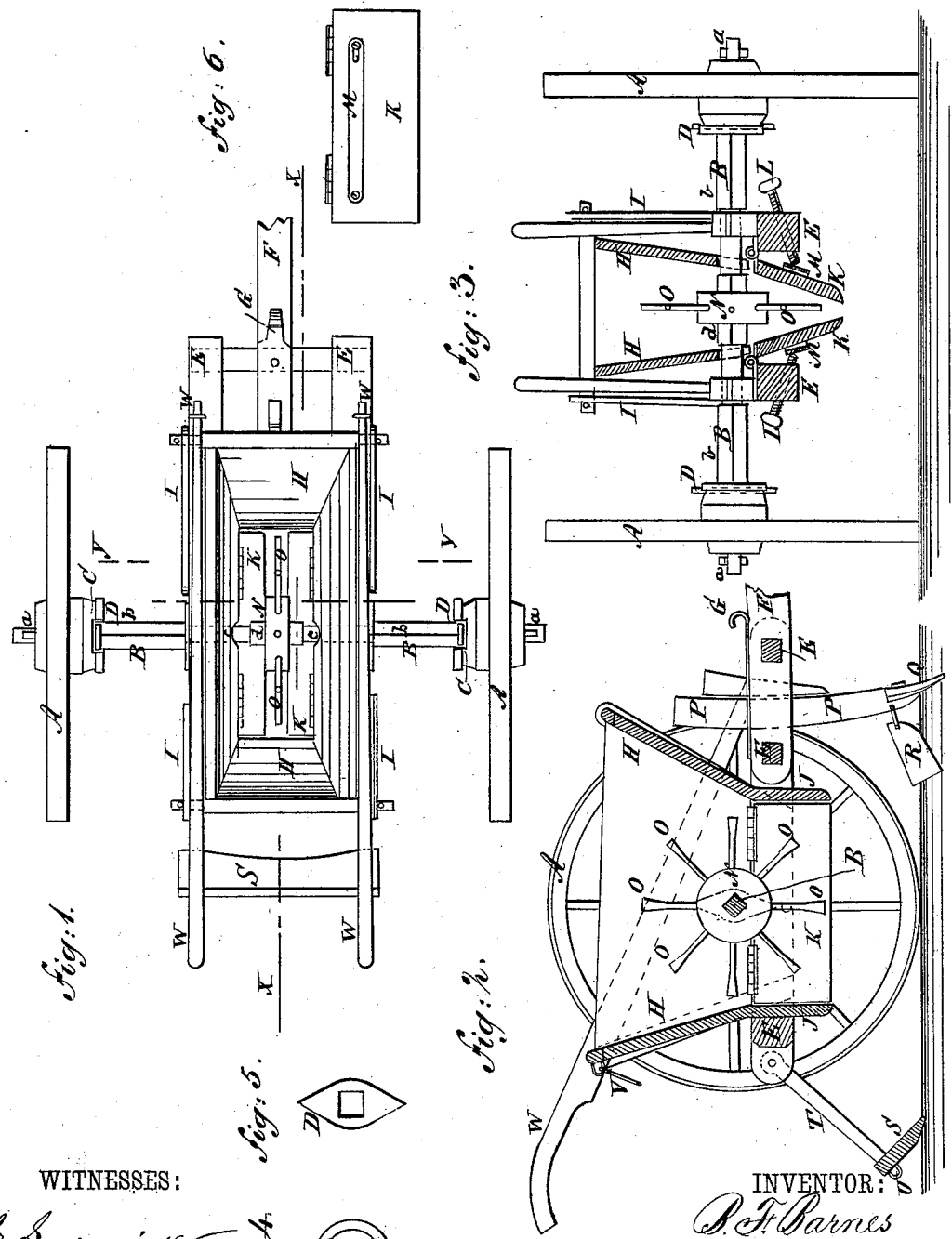
WITNESSES:
INVENTOR:
B. F. Barnes
BY Munn & Co.
ATTORNEYS.

UNITED STATES PATENT OFFICE.

BENJAMIN F. BARNES, OF CAMPBELLTON, FLORIDA.

COMBINED PLANTER AND FERTILIZER-DISTRIBUTER.

SPECIFICATION forming part of Letters Patent No. 254,188, dated February 28, 1882.

Application filed January 12, 1881. (No model.)

*To all whom it may concern:*

Be it known that I, BENJAMIN F. BARNES, of Campbellton, in the county of Jackson and State of Florida, have invented a new and useful Improvement in Combined Cotton-Planter and Fertilizer-Distributer, of which the following is a specification.

Figure 1 is a plan view of the improvement. Fig. 2 is a sectional side view taken through the line $x\, x$, Fig. 1. Fig. 3 is a sectional end elevation taken through the line $y\, y$, Fig. 1. Fig. 4 is an end view of one of the hubs. Fig. 5 represents one of the clutch-bars. Fig. 6 represents one of the hinged side-boards.

Similar letters of reference indicate corresponding parts.

My invention relates to improvements in cotton-planters and fertilizer-distributers; and it consists in the peculiar arrangement and construction of the parts, as hereinafter more fully set forth, and pointed out in the claim.

A are the wheels, which revolve upon the journals of the axle B. The inner ends of the hubs of the wheels A have cross grooves or notches C formed in them, or have notched bands attached to them. The axle B is made square at $b\, b$ on each side of its rounded ends $a\, a$, and upon its squared parts $b\, b$ are placed cross clutch-bars D, which may be moved upon the axle B to enter or be withdrawn from the notches in the inner ends of the hubs of the wheels A, to cause the wheels to carry the axle B with them in their revolution or to revolve upon their journals. The axle B is made round at $c\, c$, and its rounded parts revolve in bearings attached to the side bars of the frame E, to the forward end of which is attached a tongue, F, or shafts, according as two horses or one are to be attached to it.

To the forward end of the frame E is attached a hook, G, or other appliance to receive the draft. H is the hopper, which is placed over the middle part of the frame E, and is attached at its corners to the upper ends of four bars, I. The lower ends of the bars I are attached to the side bars of the frame E. The ends of the hopper H are extended below the frame E, to serve as ends J to the discharge-chamber. The sides K of the discharge-chamber are hinged at their upper edges to the side bars of the frame E, so that their lower edges may be adjusted closer together or farther apart, according as less or more seed is to be dropped or a finer or coarser fertilizer is to be distributed.

The hinged side-boards K are held at the desired distance apart by hand-screws L, which pass through screw-holes in the side bars of the frame E, and their forward ends rest against curved springs M, attached to the hinged side-boards K. The springs M are slotted at one or both ends to receive the fastening-screws, so that the side-boards K may yield should a lump of fertilizer be forced out between their edges.

To the axle B, made square at $d$, within the hopper H, is attached a cylinder or hub, N, to which are attached radial arms O, to force the seed or fertilizer into and out through the discharge-chamber.

To the middle forward part of the frame E is attached a standard, P, to the lower end of which is attached a plow, Q, to open a furrow to receive the seed.

To the rear side of the lower end of the standard P is hinged a block, R, to pack the sides of the furrow and prevent the soil from falling in before the seed has been deposited in it. The furrow is filled, and the seed is covered by the coverer S, to the ends of which are attached the lower ends of the bars T. The upper ends of the bars T are hinged to the rear ends of the side bars of the frame E.

To the middle part of the coverer-block S is attached an eye or staple, U, to receive a hook, V, pivoted to the upper part of the rear end of the hopper H or other suitable support for suspending the coverer when turning around or passing from place to place.

W are the handles, the lower ends of which are attached to the forward parts of the side bars of the frame E. The handles W pass up at the sides of the hopper H, and are attached to the rear corners of the said hopper H.

By the above-described construction it will be seen that the machine may be employed as a cart for carrying the fertilizer from the barn-yard or compost-heap to the field by sliding the clutch-bars along the axle, so as not to be in engagement with the hubs, and holding the hinged doors of the hopper closed by means of their screws; and when the machine has been carried into the field the clutch-bars may be made to engage with the hubs and the fertilizer distributed, thus avoiding the rehandling of the fertilizer and employing the machine both as a cart and distributer of the fertilizer.

I am aware that a clutch adapted to slide on an axle and engage with or be disengaged from notches in the hub of a wheel, whereby the axle and wheel may be coupled or uncoupled, as desired, is not new; and I am also aware that an axle has heretofore been constructed having rounded ends and a squared central portion; and I am further aware that a hopper has heretofore been provided at its lower end with hinged doors, adjusted by means of screws, and I therefore lay no claim, broadly, to such constructions, my invention being confined to the arrangement and construction of the parts as pointed out in the claim.

Having thus described my invention, I claim as new and desire to secure by Letters Patent—

In a combined cotton-planter and fertilizer-distributer, the combination, with the wheels A, having notched hubs C, and axle B, provided with the rounded ends $a$, squared parts $b$, rounded parts $c$, and squared middle $d$, carrying the stirrer N O, of the clutch-bars D, sliding on the axle, frame E, hopper H, provided with side extensions, J, and hinged sides K, having flat springs M, slotted at their ends, and set-screws L, whereby the machine may be employed as a cart or fertilizer-distributer, substantially as described.

BENJAMIN F. BARNES.

Witnesses:
E. N. DEKLE,
J. W. CALLAWAY.